(12) United States Patent
Vadel et al.

(10) Patent No.: US 12,314,906 B2
(45) Date of Patent: May 27, 2025

(54) WORKFORCE MANAGEMENT IN AN AGILE DEVELOPMENT ENVIRONMENT

(71) Applicant: FMR LLC, Boston, MA (US)

(72) Inventors: Taleb Khyar Mohamed Vadel, Woonsocket, RI (US); Dan Mahoney, Hudson, NH (US); Ellen Ryan, Charlestown, MA (US)

(73) Assignee: FMR LLC, Boston, MA (US)

(*) Notice: Subject to any disclaimer, the term of this patent is extended or adjusted under 35 U.S.C. 154(b) by 164 days.

(21) Appl. No.: 18/090,776

(22) Filed: Dec. 29, 2022

(65) Prior Publication Data

US 2024/0220928 A1 Jul. 4, 2024

(51) Int. Cl.
*G06Q 10/0631* (2023.01)
*G06Q 10/10* (2023.01)

(52) U.S. Cl.
CPC ... *G06Q 10/103* (2013.01); *G06Q 10/063118* (2013.01)

(58) Field of Classification Search
None
See application file for complete search history.

(56) References Cited

U.S. PATENT DOCUMENTS 8,332,251 B1 * 12/2012 Morris ............... G06Q 10/06 705/7.22
8,527,312 B2 9/2013 Taix et al.
10,387,811 B2 8/2019 Carnevale et al.
10,395,194 B2 8/2019 Bothello et al.

(Continued)

FOREIGN PATENT DOCUMENTS

WO WO-2008112711 A1 * 9/2008 ............ G06Q 10/06
WO WO-2018053438 A1 * 3/2018 ............ G06N 7/005

(Continued)

OTHER PUBLICATIONS

Zhongbin "Fuxi: An Agile Development Environment for Embedded Systems", Dec. 2007, IEEE, pp. 1-2 (Year: 2007).*

(Continued)

*Primary Examiner* — Romain Jeanty
(74) *Attorney, Agent, or Firm* — Cesari and McKenna, LLP

(57) ABSTRACT

Methods and apparatuses are described for workforce management in an Agile development environment. A server retrieves data from software development workforce applications, including Agile data. The server creates an Agile organization hierarchy data structure using the retrieved data. The Agile organization hierarchy data structure comprises developer nodes; developer position nodes; team structure nodes; project domain nodes; and business unit nodes. Each node is connected to other nodes in the data structure. The server generates, for display on a client device, a user interface comprising the Agile organization hierarchy data structure. The server determines adjustments to the Agile organization hierarchy data structure based upon input received from the client device. The server updates a connection between nodes in the Agile organization hierarchy data structure based upon the determined adjustments. The server transmits the updated Agile organization hierarchy data structure to the client device for display.

18 Claims, 16 Drawing Sheets

(56) References Cited

U.S. PATENT DOCUMENTS

| | | |
|---|---|---|
| 11,126,941 B1 | 9/2021 | Schlintl et al. |
| 2013/0090971 A1* | 4/2013 | Morris .................. G06Q 10/06 |
| | | 705/7.22 |
| 2014/0172514 A1* | 6/2014 | Schumann ....... G06Q 10/06393 |
| | | 705/7.39 |
| 2015/0081363 A1* | 3/2015 | Taylor .................. G06Q 40/00 |
| | | 705/7.14 |
| 2017/0221165 A1 | 8/2017 | Sawant et al. |
| 2018/0046455 A1* | 2/2018 | Walsh .................... G06F 16/22 |
| 2018/0210709 A1* | 7/2018 | Bharthulwar ............ G06F 8/33 |
| 2021/0365856 A1* | 11/2021 | Mukherjee ........... G06Q 10/103 |

FOREIGN PATENT DOCUMENTS

| | | | |
|---|---|---|---|
| WO | WO-2019170607 A1 * | 9/2019 | ............. G06F 17/16 |
| WO | WO-2021081576 A1 * | 5/2021 | ......... G06Q 10/0635 |

OTHER PUBLICATIONS

Carlos et al "Agile Management in Product Development", Oct. 2019, Resources, pp. 1-5 (Year: 2019).*

Mehdi et al "Software Architectural Design in Agile Environments", Jan. 2018, Journal of Computer and Communications, pp. 171-189 (Year: 2018).*

* cited by examiner

● General Information
  Position type, role and job details

② Position Information
  Location, cost center and role information.

③ Confirm & Submit
  Good to go.

Great going! few more details and we are good to go.

Work Entity
DevSecOps

Home Entity
PI Technology

Primary Job Location
Westlake, TX

Hiring Manager
Dan Smith

Leader of Work Entity
John Doe

Funding Source
Funding Source 1

Start Date
02/12/2021

End Date
02/12/2022

922

Back    Cancel

920

Request New Position

Let's get started. All fields are mandatory unless marked as optional.

● General Information
Position type, role and job details

● Position Information
Location, cost center and role information

○ Confirm & Submit
Good to go.

Good to go. Review and confirm position details.

Position 1 - (Software Engineer)

| | | | |
|---|---|---|---|
| Position Type: | Full Time Employee | Hiring Manager: | Dan Smith |
| Title: | Principal Software Engineer | Leader of Work Entity: | John Doe |
| Grade: | 6 | Funding Source: | Funding Source 1 |
| Role: | Member | Start Date: | 02/12/2021 |
| Home Entity: | DevSecOps | End Date: | 02/12/2022 |
| Work Entity: | PI Technology | | |

✏ Edit    🗑 Delete    ← 934

← 932

Cancel ← 936

Positions

Search name, position ID, requisition ID, Corp ID | All Statuses ∨ | All Locations ∨ | More Filters Quick Filters: Vacant positions    Filled positions    Pending approval

| Position ID | Work Assignment | Home Assignment | Associate | Location | Position Manager | Requisition ID | Start Date | Status | Time of Status |
|---|---|---|---|---|---|---|---|---|---|
| POS0047829 | DevSecOps | Platform Engineering | John Smith | Westlake | Venkatesh Yerramsetty | | | Pending | 1 day |
| POS0077438 | DevSecOps | Platform Engineering | | Dalian | Hongsong Zhou | | 4/19/2021 | Rejected ⚠ | 1 day |
| POS0080794 | DevSecOps | Platform Engineering | | Westlake | Venkatesh Yerramsetty | | 4/19/2021 | Approved | 2 days |
| POS0086733 | DevSecOps | Platform Engineering | | Westlake | Venkatesh Yerramsetty | Req28793 | 4/19/2021 | Vacant | 29 days |
| POS0086768 | DevSecOps | Platform Engineering | Zack Zeng | Westlake | Venkatesh Yerramsetty | Req28793 | 4/19/2021 | Filled | 1 mo |

1004 → (row 2)
1002 → (table)

WORKFORCE MANAGEMENT IN AN AGILE DEVELOPMENT ENVIRONMENT

TECHNICAL FIELD

This application relates generally to methods and apparatuses, including computer program products, for workforce management in an Agile development environment.

BACKGROUND

Software development project management generally relates to creating and managing a development timeline, and coordinating appropriate resources (e.g., assigning software developers to specific tasks), that result in completion of a software development project. One approach to software development project management is the use of an Agile development framework. Agile is characterized by the utilization of quick, efficient development periods (called sprints), at the end of which one or more deliverables are created and then further sprints are adapted in response to changing development needs and objectives. Generally, Agile development provides that a project can be organized into one or more segments with each segment being broken down into a plurality of 'stories'—each story defining a particular piece of functionality in the segment. Stories typically include a description of the required functionality, acceptance criteria, story points (i.e., estimation of effort), start time, end time, creator, assignee (i.e., developer(s) that will work on the story), and so forth. The difference between the start time and the end time of the story is understood as the cycle time—that is, the total elapsed time including process time (during which a unit of work is acted upon to bring the story closer to an output) and delay time (during which a unit of work is used waiting to take the next action). Each story can be further partitioned into tasks. Typically, each sprint involves a developer or a team of developers conducting a full development cycle including planning, designing, coding, and quality assurance/testing phases. Due to the sheer volume of employees that may be working in an Agile-based organization on various different software development projects, it is essential that organizations can quickly and efficiently analyze the software development process across roles, teams, and other structures in the Agile environment to get a complete view of the development process.

As software project management has become increasingly standardized and structured, current-generation human resource (HR) management systems, finance systems, and workforce planning systems have struggled to provide providing a complete understanding of an organization's workforce. Often, such systems are isolated from each other and rely on completely different data contexts, which makes integration of their data into a platform-agnostic, easily interpretable data structure very difficult. Furthermore, such systems lack the capability to dynamically and adaptively adjust characteristics of an Agile organization hierarchy—such as developer assignments, team roles, project domains, and business unit data—due to the above-referenced data limitations. This prevents downstream systems like project management, issue tracking, budgeting, employee/talent management, and other computing platforms that require a full view of the organization's Agile hierarchy data from providing actionable insights that can improve the organization's software development efficiency, cost containment, and employee growth.

SUMMARY

Therefore, what is needed are methods and systems that leverage common data definitions, standards of practice, and gain agreement on Agile affiliations and organizational data to support cross-business-unit career vitality and collaboration for employees, and also to serve as a true data source for the entire organization in managing workflows, costs, project timelines, structural alignments, and delivery outcomes. The techniques described herein advantageously enable the capture and tracking of an organization's Agile hierarchy—including employees, teams, projects, domains, business units and so forth—in a platform-agnostic data structure that can be consumed by downstream computing devices for automated processing and decision making within the Agile environment. The methods and systems herein provide many benefits to an organization, including:
 Agile System of Record—the primary system of record for the organization's Agile hierarchy, assignments, and affiliations;
 Who's Who Visualization—an up-to-date view of the connections between domains, tribes, squads, teams, centers of excellence (CoEs), chapters and employees contributing to each part of the Agile hierarchy;
 Governance and Service Model—a governance model for defining Agile structures and assignments to promote data is current, consistent, and accurate;
 Integrated Data Model—the Agile organization hierarchy data model is exposed (e.g., via API) as a product offering to permit reporting, analytics, and measurement, combining core employee/associate data with Agile data;
 Downstream Consumption of Data Model—Agile hierarchy data can be seamlessly integrated with other organizational data sources and capabilities such as Jira™ for project management. Jira Align™ for Goals. Technology Business Management (TBM) Anaplan™ for financials and so forth.

The invention, in one aspect, features a system for workforce management in an Agile development environment. The system comprises a server computing device having a memory that stores computer-executable instructions and a processor that executes the computer-executable instructions. The server computing device retrieves, via one or more application programming interfaces, data from a plurality of software development workforce applications, wherein the data includes Agile project data, Agile team structure data, developer attribute data, developer assignment data, and Agile project financial data. The server computing device creates an Agile organization hierarchy data structure using the retrieved data. The Agile organization hierarchy data structure comprises a plurality of developer nodes, each developer node comprising one or more attributes of a developer including a home location of the developer; a plurality of Agile developer position nodes, each Agile developer position node comprising a position associated with one or more Agile project development teams; a plurality of Agile team structure nodes, each Agile team structure node comprising a group of developer positions corresponding to a different facet of an Agile project development team; a plurality of Agile project domain nodes, each Agile project domain node comprising a plurality of Agile project development team facets, and a plurality of business unit nodes, each business unit node comprising a plurality of Agile project domains. Each developer node is coupled to one or more Agile developer position nodes, each Agile developer position node is coupled to a plurality of Agile team structure nodes, each Agile team structure node is coupled to an Agile project domain node, and each Agile project domain node is coupled to a business unit node. The server computing device generates, for display on a client computing device, a user interface comprising the Agile organization hierarchy data structure. The server computing device determines one or more adjustments to the Agile organization hierarchy data structure based upon input received from the client computing device. The server computing device updates a connection between one or more nodes in the Agile organization hierarchy data structure based upon the determined adjustments. The server computing device transmits the updated Agile organization hierarchy data structure to the client computing device for display.

The invention, in another aspect, features a computerized method of workforce management in an Agile development environment. A server computing device retrieves, via one or more application programming interfaces, data from a plurality of software development workforce applications, wherein the data includes Agile project data, Agile team structure data, developer attribute data, developer assignment data, and Agile project financial data. The server computing device creates an Agile organization hierarchy data structure using the retrieved data. The Agile organization hierarchy data structure comprises a plurality of developer nodes, each developer node comprising one or more attributes of a developer including a home location of the developer; a plurality of Agile developer position nodes, each Agile developer position node comprising a position associated with one or more Agile project development teams; a plurality of Agile team structure nodes, each Agile team structure node comprising a group of developer positions corresponding to a different facet of an Agile project development team; a plurality of Agile project domain nodes, each Agile project domain node comprising a plurality of Agile project development team facets, and a plurality of business unit nodes, each business unit node comprising a plurality of Agile project domains. Each developer node is coupled to one or more Agile developer position nodes, each Agile developer position node is coupled to a plurality of Agile team structure nodes, each Agile team structure node is coupled to an Agile project domain node, and each Agile project domain node is coupled to a business unit node. The server computing device generates, for display on a client computing device, a user interface comprising the Agile organization hierarchy data structure. The server computing device determines one or more adjustments to the Agile organization hierarchy data structure based upon input received from the client computing device. The server computing device updates a connection between one or more nodes in the Agile organization hierarchy data structure based upon the determined adjustments. The server computing device transmits the updated Agile organization hierarchy data structure to the client computing device for display.

Any of the above aspects can include one or more of the following features. In some embodiments, determining one or more adjustments to the Agile organization hierarchy data structure based upon input received from the client computing device comprises determining one or more vacant positions in one or more Agile project domains using the Agile organization hierarchy data structure, identifying one or more developers as candidates for each vacant position using the Agile organization hierarchy data structure, and assigning an identified developer to each vacant position and connecting the corresponding developer node to the Agile developer position node for the vacant position in the Agile organization hierarchy data structure. In some embodiments, determining one or more vacant positions in one or more Agile project domains using the Agile organization hierarchy data structure comprises identifying an Agile developer position node that (i) is coupled to one or more Agile team structure nodes and (ii) is not coupled to any developer nodes. In some embodiments, identifying one or more developers as candidates for each vacant position using the Agile organization hierarchy data structure comprises selecting one or more developer nodes with attributes that match the identified Agile developer position node. In some embodiments, the selected one or more developer nodes are not coupled to any Agile developer position nodes.

In some embodiments, the server computing device updates one or more assignments in the Agile project domain to which the identified developer is assigned based upon the adjusted Agile organization hierarchy data structure. In some embodiments, updating one or more assignments in the Agile project domain to which the identified developer is assigned comprises modifying one or more project boards in a development issue tracking system to include issue assignments for the identified developer. In some embodiments, the server computing device generates a financial cost for one or more Agile projects using the Agile organization hierarchy data structure and displays the financial cost of the one or more Agile projects on the client computing device.

In some embodiments, the different facets of the Agile project development team comprise tribes, squads, chapters, teams, and centers of excellence. In some embodiments, the server computing device harmonizes the data from each of plurality of software development workforce applications before creating the Agile organization hierarchy data structure. In some embodiments, upon displaying the updated Agile organization hierarchy data structure, the client computing device also displays one or more aggregated developer workforce attributes associated with the updated Agile organization hierarchy data structure. In some embodiments, the one or more aggregated developer workforce attributes comprise an active developer headcount for one or more Agile project domains, a list of open requisitions for one or more Agile project domains, and a list of vacant positions for one or more Agile project domains.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 9A is a diagram of an exemplary user interface screen for requesting a new position.

FIG. 9B is a diagram of an exemplary user interface screen that displays the pre-populated template for a new position based upon an existing team member.

FIG. 9C is a diagram of an exemplary user interface screen that displays additional attributes for a new position.

FIG. 9D is a diagram of an exemplary user interface screen that displays a review and confirmation interface for a new position.

FIG. 10A is a diagram of an exemplary user interface screen that displays a list of positions for an Agile entity, including vacant positions, filled positions, pending position approvals, and requisitions.

FIG. 10B is a diagram of an exemplary user interface screen that displays a position rejection detail view.

FIG. 10C is a diagram of an exemplary user interface screen that displays a position approval detail view.

DETAILED DESCRIPTION

Figure 1:
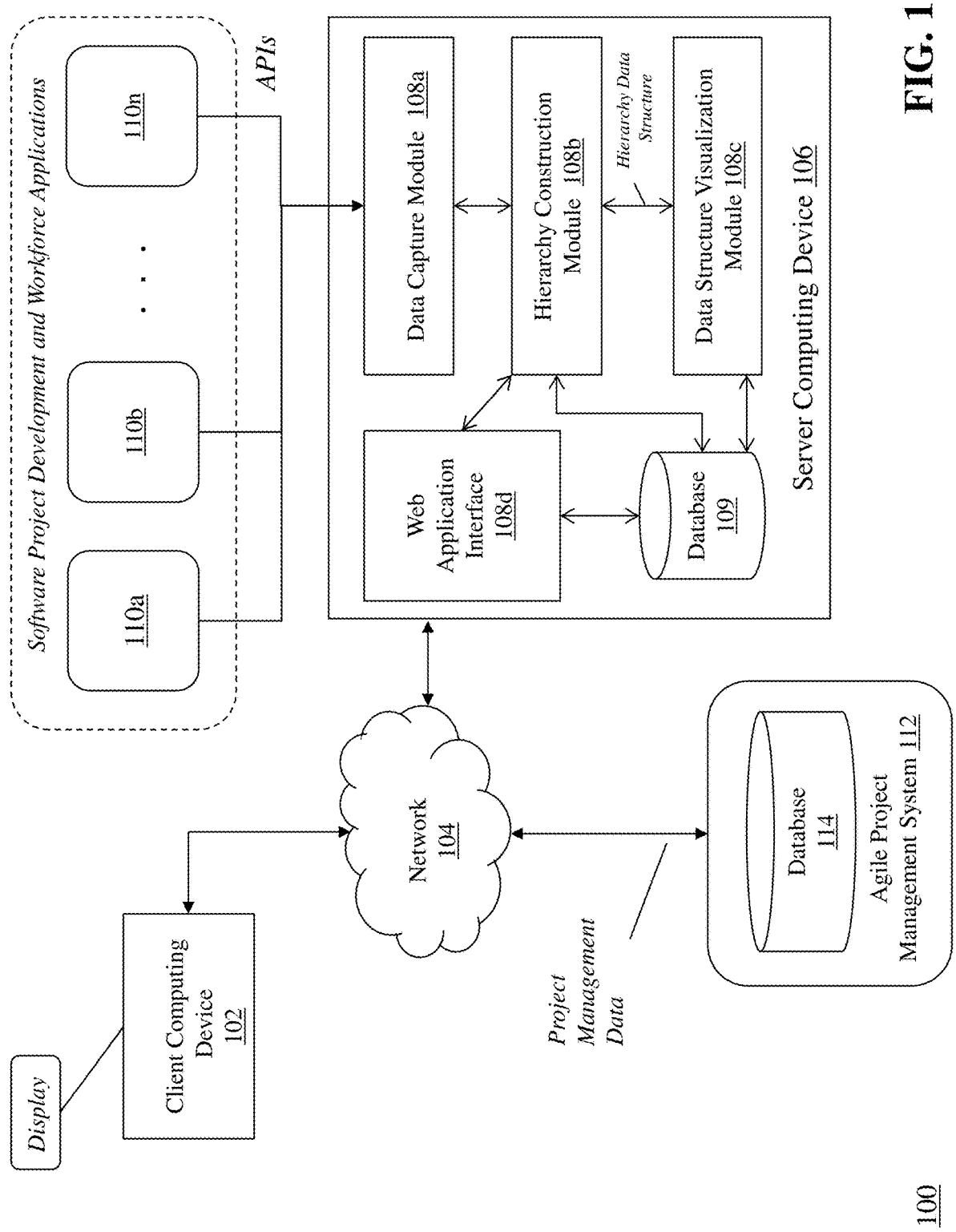
FIG. 1 is a block diagram of a system for workforce management in an Agile development environment.

FIG. 1 is a block diagram of a system 100 for workforce management in an Agile development environment. System 100 includes client computing device 102, communications network 104, server computing device 106 that includes data capture module 108a, hierarchy construction module 108b, and data structure visualization module 108c, software project development and workforce applications 110a-110n, and Agile development management computing system 114 coupled to network 104 that includes database 116 for storing, e.g., project management data for one or more Agile software projects, including the Agile organization hierarchy data structure and related metadata generated by hierarchy construction module 108b.

Client computing device 102 connects to communications network 104 in order to communicate with server computing device 106 and Agile development management system 112 to provide input and receive output relating to the process of workforce management in an Agile development environment as described herein. In some embodiments, client computing device 102 is coupled to a display device (e.g., a monitor or screen). For example, client computing device 102 can provide a graphical user interface (GUI) via the display device that presents output resulting from the methods and systems described herein.

Exemplary client computing devices 102 include but are not limited to desktop computers, laptop computers, tablets, mobile devices, smartphones, and internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Communications network 104 enables client computing device 102, server computing device 106 and Agile development management system 112 to communicate with each other. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on one or more processors and interact with memory modules of server computing device 106, to receive data from other components of system 100, transmit data to other components of system 100, and perform functions for workforce management in an Agile development environment as described herein. Server computing device 106 includes several computing modules 108a-108c that execute on one or more processors of server computing device 106. In some embodiments, modules 108a-108c are specialized sets of computer software instructions programmed onto one or more dedicated processors in server computing device 106 and can include specifically-designated memory locations and/or registers for executing the specialized computer software instructions.

Although modules 108a-108c are shown in FIG. 1 as executing within the same server computing device 106, in some embodiments the functionality of modules 108a-108c can be distributed among a plurality of server computing devices. As shown in FIG. 1, server computing device 106 enables modules 108a-108c to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 108a-108c is described in detail throughout the specification.

Software project development and workforce applications 110a-110n comprise a plurality of applications deployed on one or more computing devices (such as remote computing devices, web application servers, and/or other server computing devices) communicatively coupled to server computing device 106. In some embodiments, each application 110a-110n communicates with server computing device 106 via a separate application programming interface (API). As can be appreciated, server computing device 106 can retrieve data from applications 110a-110n by issuing one or more calls to the application using the corresponding API. Applications 110a-110n can comprise a plurality of different software applications that contain data useful for generating the Agile organization hierarchy data structure as described herein. Exemplary applications 110a-110n can include, but are not limited to, human resources (HR) software platforms (e.g., Workday® Human Capital Management (HCM) available from Workday, Inc. of Pleasanton, California, and SAP Fieldglass™ Vendor Management System available from SAP Fieldglass of Chicago, Illinois) that contain workforce/employee/associate information, job titles and job roles, and other core employee data; Agile project development systems (e.g., Agile project data systems, Agile team structure data systems, Agile team/developer assignment data systems, and Agile project financial data systems); and software product release and deployment platforms. Examples of HR software platforms that can be used with system 100 are.

Agile project management computing system 112 is a computing device (or in some embodiments, a set of computing devices) coupled to server computing device 106 via network 104 and is configured to receive, generate, store, and make available specific segments of data relating to the process of workforce management in an Agile development environment as described herein. In some embodiments, Agile project management computing system 112 is a JIRA™-based computing platform that enables developers to enter, save, update, and remove, e.g., Agile stories, tasks, and the like (via a user interface provided by client computing device 102) for one or more ongoing software development projects. Agile project management computing system 112 includes database 114 for storing Agile project management data, among other things, including both historical Agile project data and current (or newly-entered but not yet saved) Agile project data. In some embodiments, all or a portion of database 114 can be integrated with Agile project management computing system 112 or be located on a separate computing device or devices. Database 114 can comprise one or more databases configured to store portions of data used by the other components of system 100, as will be described in greater detail below. In some embodiments, Agile project management computing system 112 is coupled to server computing device 106 via an API that enables system 112 to consume data associated with the Agile organization hierarchy data structure generated by module 108b. Agile project management computing system 112 can transmit the data to other downstream computing systems or applications, such as specific project management or workforce analysis tools (e.g., JiraAlign™ available from Atlassian Corp. Plc of Sydney, Australia; AgilityHealth® available from AgilityHealth of Omaha, NE).

Figure 2:
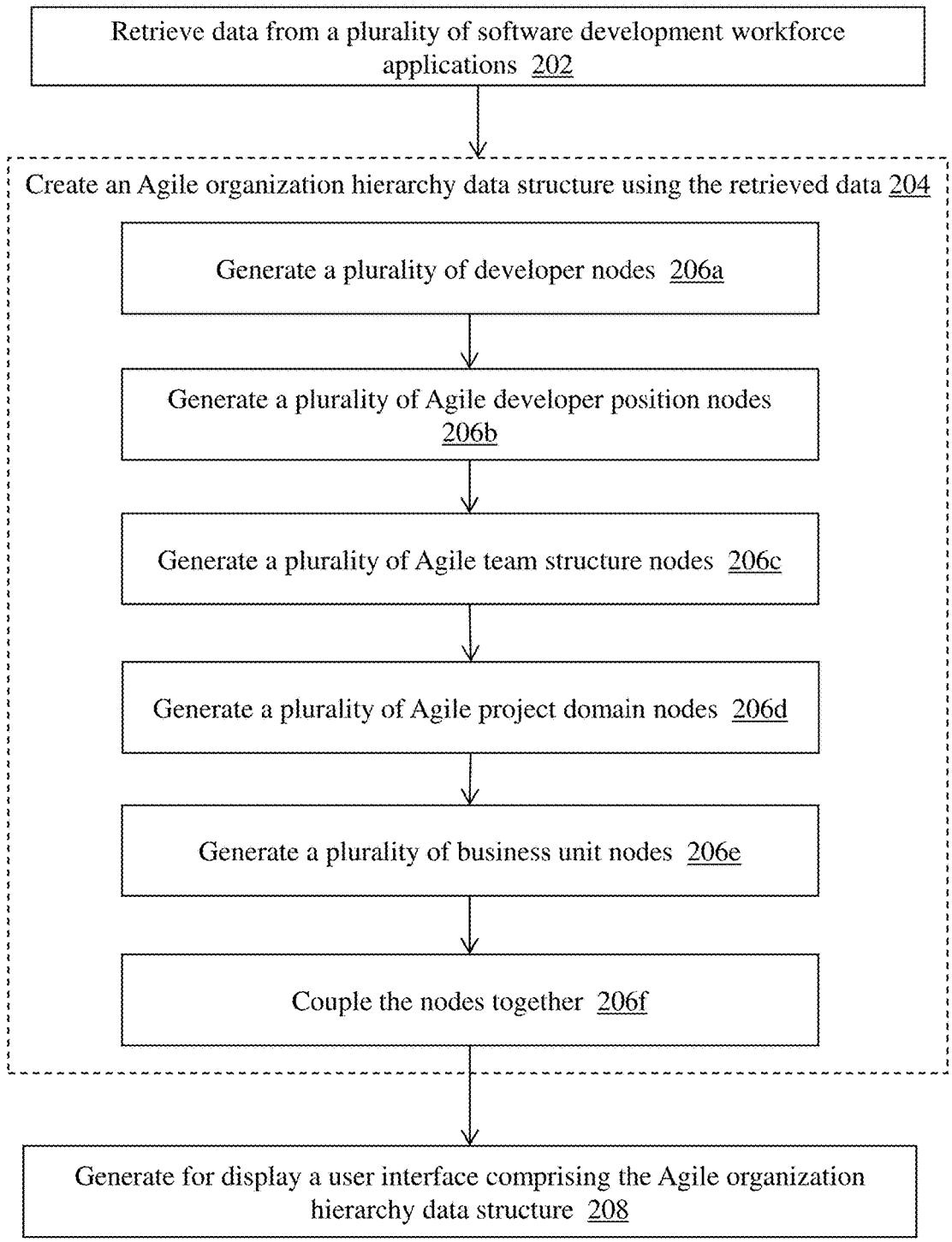
FIG. 2 is a flow diagram of a computerized method of creating an Agile organization hierarchy data structure using data from a plurality of software project development and workforce applications.

FIG. 2 is a flow diagram of a computerized method 200 of creating an Agile organization hierarchy data structure using data from a plurality of software project development and workforce applications, using system 100 of FIG. 1. Data capture module 108a of server computing device 106 retrieves (step 202), via one or more application programming interfaces, data from a plurality of software project development and workforce applications 110a-110n. In some embodiments, the retrieved data includes Agile project data, Agile team structure data, developer attribute data, developer assignment data, and Agile project financial data. For example, data capture module 108a can be configured to retrieve specific data elements from each of a plurality of applications 110a-110n that correspond to features or attributes of an organization's Agile software development hierarchy (e.g., developers, teams, projects, business units, domains). As can be appreciated, often such features or attributes are distributed across a spectrum of independent, siloed software applications that may comprise data in different formats and/or managed by different entities. In some embodiments, data capture module 108a comprises an Extract-Transform-Load (ETL)-based data retrieval tool (e.g., Informatica™) that manages retrieval of data from the applications 110a-110n.

Hierarchy construction module 108b receives the data from data capture module 108a and creates (step 204) an Agile organization hierarchy data structure using the retrieved data. Advantageously, module 108b generates a platform-agnostic, traversable data structure that combines the Agile project development and workforce data retrieved from the disparate applications 110a-110n in a harmonized manner for downstream consumption by other computing systems. This process enables the downstream computing systems to display, analyze, and update the Agile organization hierarchy data structure using a single data repository and interface, and without requiring each consuming device to establish separate connections to each of the applications 110a-110n, contain individualized modules to parse/translate data from each application, or have access to an incomplete view of the organization's Agile development hierarchy and infrastructure.

Generally, the Agile organization hierarchy data structure comprises a plurality of nodes, each node corresponding to a specific entity in the organization, and one or more connections between each node—where the connection defines a relationship between the two connected nodes. Each node comprises one or more data elements, i.e., values or attributes associated with the specific entity. As can be appreciated, an entity can be a person, a role, a chapter, a position, a project, a team, a business unit, or any other type of entity that may be represented in an Agile organization. Further detail on the entities that comprise an exemplary Agile organization hierarchy data structure is provided below.

To create the Agile organization hierarchy data structure, module 108b generates (step 206a) a plurality of developer nodes. Each developer node corresponds to an individual employee (e.g., software developer, QA personnel, project manager, team lead) that is employed by the organization as part of the Agile development framework. In some embodiments, the developer node comprises a plurality of data elements such as developer name, developer home business unit, developer demographic information, developer skills or skillsets, and so forth. Typically, the developer node does not contain specific information about the employee's assignments or roles within the organization. Instead, a developer node can be connected to one or more developer position nodes to define one or more positions to which a given employee/associate is fulfilling. It should be appreciated that other types of data elements can be included in the developer node without departing from the scope of the technology described herein.

Hierarchy construction module 108b generates (step 206b) a plurality of Agile developer position nodes. Each developer position node corresponds to a position or role in the Agile organization that can be filled by a developer. In some embodiments, the developer position node comprises a plurality of data elements such as position title, position role, position skill set, and so forth. Typically, the developer position node does not contain specific information about squads, chapters, teams, and/or centers of excellence (CoE) in the Agile organization to which the position relates. Instead, a developer position node can be connected to Agile team structure nodes (i.e., one or more squad nodes, one or more chapter nodes, one or more team nodes and/or one or more CoE nodes) to define one or more squads, chapters, teams, and/or CoEs in which a given position is contained. It should be appreciated that other types of data elements can be included in the developer position node without departing from the scope of the technology described herein.

Hierarchy construction module 108b generates (step 206c) a plurality of Agile team structure nodes. Each team structure node corresponds to a different facet of an Agile team within the Agile organization. For example, an Agile team structure may be associated with one or more squads, one or more chapters, one or more teams, one or more centers of excellence, one or more tribes, and/or one or more chapter areas. Module 108b can generate one or more nodes for each different facet of a given Agile team. In some embodiments, a squad node comprises a plurality of data elements such as squad name, squad goal(s), squad task(s), squad skillset(s), mission statement, leader position, cost category, team email address, and so forth. In some embodiments, a chapter node comprises a plurality of data elements such as chapter name, chapter goal(s), chapter task(s), chapter skillset(s), mission statement, leader position, cost category, team email address, and so forth. In some embodiments, a center of excellence node comprises a plurality of data elements such as CoE name, CoE goal(s), CoE task(s), CoE skillset(s), mission statement, leader position, cost category, team email address, and so forth. In some embodiments, a team node comprises a plurality of data elements such as team name, team goal(s), team task(s), team skillset(s), mission statement, leader position, cost category, team email address, and so forth. In some embodiments, a tribe node comprises a plurality of data elements such as tribe name, tribe goal(s), tribe task(s), tribe skillset(s), mission statement, leader position, cost category, team email address, and so forth. In some embodiments, a chapter area node comprises a plurality of data elements such as chapter area name, chapter area goal(s), chapter area task(s), chapter area skillset(s), mission statement, leader position, cost category, team email address, and so forth. In some embodiments, a tribe node is connected to one or more squad nodes to define one or more squads which are contained within the corresponding tribe. Similarly, in some embodiments a chapter area node is connected to one or more chapter nodes to define one or more chapters which are contained within the corresponding chapter area.

Hierarchy construction module 108b generates (step 206d) a plurality of Agile project domain nodes. Each project domain node corresponds to an Agile software development project in the Agile organization that may be associated with one or more team structures. In some embodiments, the project domain node comprises a plurality of data elements such as project domain name, project technical area, project status, domain mission statement, support contacts, and so forth. Typically, a project domain node does not contain specific information about team structure facets (e.g., squads, CoEs, teams, chapter areas) in the Agile organization that are part of the project domain. Instead, a project domain node can be connected to one or more Agile team structure nodes (i.e., one or more squad nodes, one or more chapter area nodes, one or more team nodes and/or one or more CoE nodes) to define one or more CoEs, teams, squads and/or chapter areas that are contained within a given project domain. It should be appreciated that other types of data elements can be included in the project domain node without departing from the scope of the technology described herein.

Hierarchy construction module 108b generates (step 206e) a plurality of Agile business unit nodes. Each business unit node corresponds to a business unit in the Agile organization that be associated with one or more project domains. In some embodiments, the business unit node comprises a plurality of data elements such as business unit name, business unit technical area, business unit goal(s), and so forth. Typically, a business unit node does not contain specific information about project domains in the Agile organization that are part of the business unit. Instead, a business unit node can be connected to one or more project domain nodes to define one or more project domains that are contained within the business unit. It should be appreciated that other types of data elements can be included in the business unit node without departing from the scope of the technology described herein.

Figure 3:
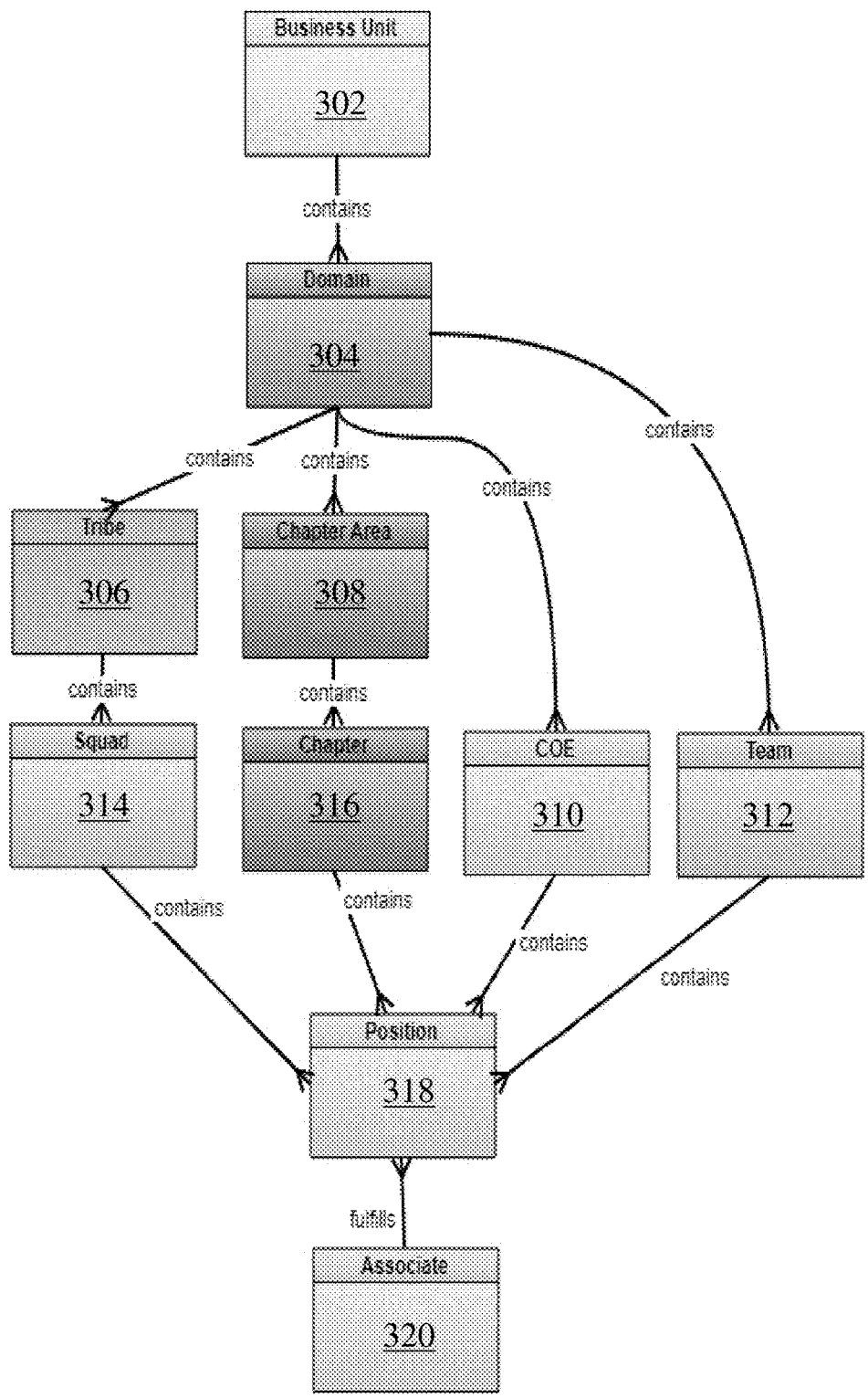
FIG. 3 is a diagram of an exemplary Agile organization hierarchy data structure generated by a hierarchy construction module of a server computing device.

Once the nodes for the Agile organization hierarchy are generated, hierarchy construction module 108b couples (step 206f) the generated nodes together. As described above, certain node types can be connected to other node types to define a relationship between the nodes. FIG. 3 is a diagram of an exemplary Agile organization hierarchy data structure 300 generated by module 108b. As shown in FIG. 3, the data structure 300 includes business unit node 302 which is coupled to one or more domain nodes (e.g., domain node 304). Domain node 304 is coupled to each of one or more tribe nodes 306, one or more chapter area nodes 308, one or more CoE nodes 310, and one or more team nodes 312. Each tribe node 306 is coupled to one or more squad nodes 314, and each chapter area node 308 is coupled to one or more chapter nodes 316. Each squad node 314, chapter node 316, CoE node 310, and team node 312 is coupled to one or more developer position nodes 318. And, each developer node 320 is coupled to one or more developer position nodes 318. Together, the nodes and connections as shown in FIG. 3 comprise an Agile organization hierarchy data structure for downstream use by one or more other computing systems as described below. In some embodiments, the Agile organization hierarchy data structure is stored in database 109 in a platform-agnostic data storage format (e.g., JSON, XML) for retrieval by one or more other computing modules and/or computing systems, such as module 108c and/or downstream computing systems like system 112.

After module 108b generates the Agile organization hierarchy data structure, data structure visualization module 108c retrieves the hierarchy data structure from database 109 for generation (step 208) of one or more user interface display screens to be presented on, e.g., client computing device 102 or other downstream computing devices. In one example, a user at client computing device 102 can establish a connection to server computing device 106 via web application interface 108d and submit a request for visualization of an Agile organization hierarchy data structure. Web application interface 108d transmits the request to module 108c, which generates one or more UI screens that display the Agile organization hierarchy data structure in total, one or more portions of the Agile organization hierarchy data structure, and/or one or more attributes of the Agile organization hierarchy data structure. Web application interface 108d transmits data associated with the generated UI screens (e.g., data, metadata, files, images, other visual elements, etc.) to client computing device 102 for display. In one embodiment, client computing device 102 displays the UI screens via a browser interface. The user at client computing device 102 can analyze the Agile organization hierarchy data structure and perform one or more actions with respect to the data structure by, e.g., providing input to client computing device 102.

Figure 4:
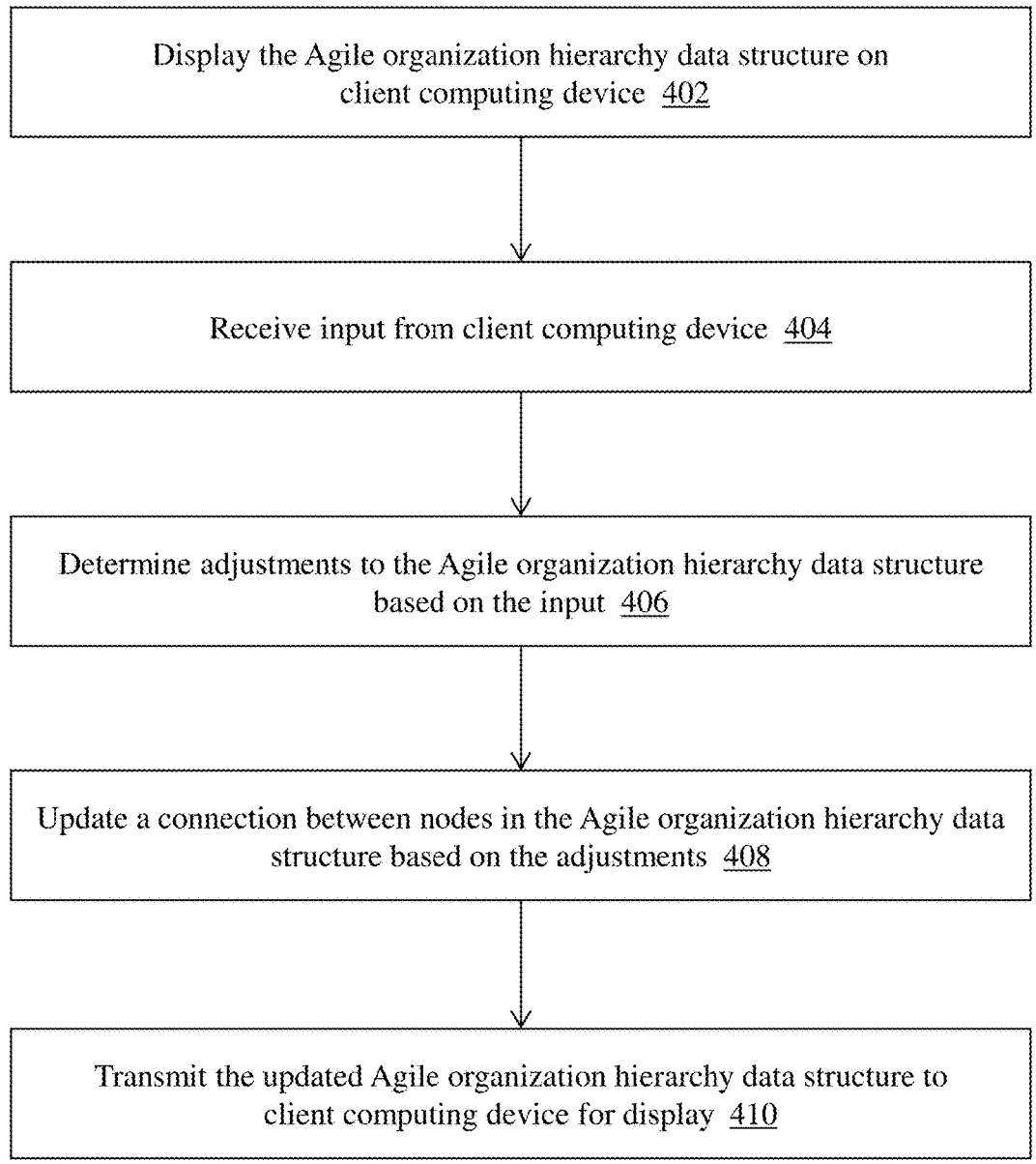
FIG. 4 is a flow diagram of a computerized method of changing an Agile organization hierarchy data structure using input derived from a client computing device.

A first exemplary use case for downstream consumption of the Agile organization hierarchy data structure can be a business unit leader or project leader that wants to adjust the hierarchy based upon, e.g., changes in personnel, changes in project timelines, changes in scope/goals of a project, and so forth. FIG. 4 is a flow diagram of a computerized method 400 of changing an Agile organization hierarchy data structure using input derived from client computing device 102, using system 100 of FIG. 1. Client computing device 102 displays (step 402) the Agile organization hierarchy data structure received from server computing device 106 on, e.g., a display screen coupled to device 102. In one embodiment, client computing device 102 receives the hierarchy data structure as an XML or JSON file and renders a graphical user interface that parses the received file to create a visual representation of the hierarchy that arranges nodes and connections according to the hierarchy. Once displayed, the user at client computing device 102 can review the hierarchy and in some instances, provide input to client computing device 102 regarding desired changes to be made to the hierarchy. For example, the user may want to re-assign a developer from one position to another or to assign the developer to a new, additional position. The user can perform one or more input actions that are received (step 404) by client computing device 102 and which cause device 102 to generate and transmit instructions to server computing device 106 to execute the desired change(s).

Web application interface 108*d* receives the instructions from client computing device 102 and transmits the instructions to hierarchy construction module 108*b*. Based upon the instructions, module 108*b* automatically determines (step 406) one or more adjustments to the Agile organization hierarchy data structure and updates (step 408) a connection between nodes in the Agile organization hierarchy data structure based on the adjustments.

Using the above example of re-assigning a developer to a different position, module 108*b* determines that to carry out this change, two alterations to the data structure must occur:
1) The connection between the developer node for the developer and the developer position node for the developer's existing position must be broken; and
2) A new connection between the developer node for the developer and the developer position node for the new position must be created.

Figure 5:
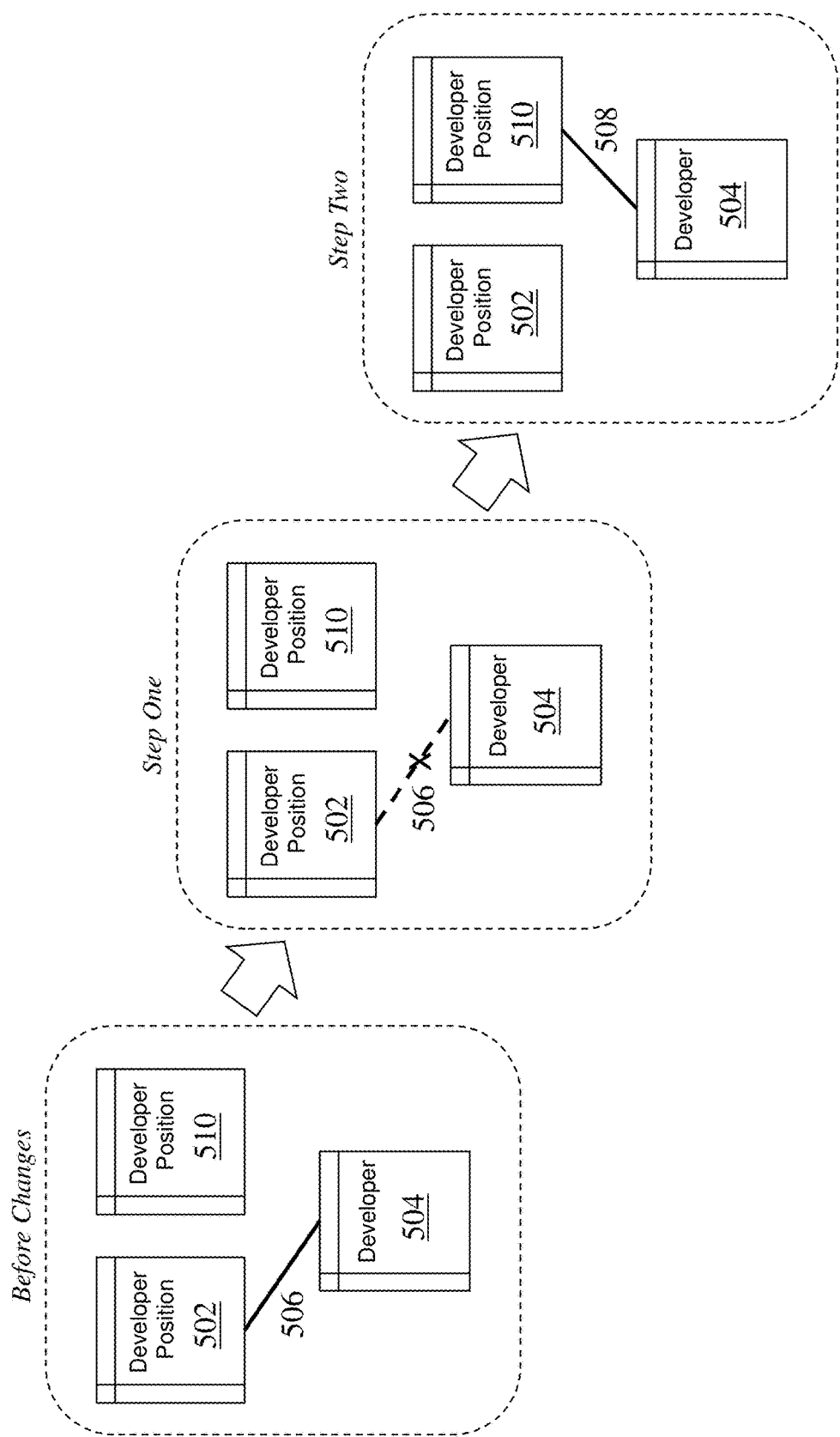
FIG. 5 is a diagram showing how the Agile organization hierarchy data structure is changed in a first use case.

FIG. 5 is a diagram showing how the Agile organization hierarchy data structure is changed in this use case. A portion of the Agile organization hierarchy data structure prior to any changes is shown on the left-hand side, with node 502 connected to node 504 via connection 506. In step one, connection 506 between developer node 502 and developer position node 504 is deleted. In step two, connection 508 between developer node 502 and developer position node 510 is created.

Using the above example of assigning a developer to a new, additional position, module 108*b* determines that to carry out this change, two alterations to the data structure must occur:
1) A new developer position node must be created; and
2) A new connection between the developer node for the developer and the new developer position node must be created.

Figure 6:
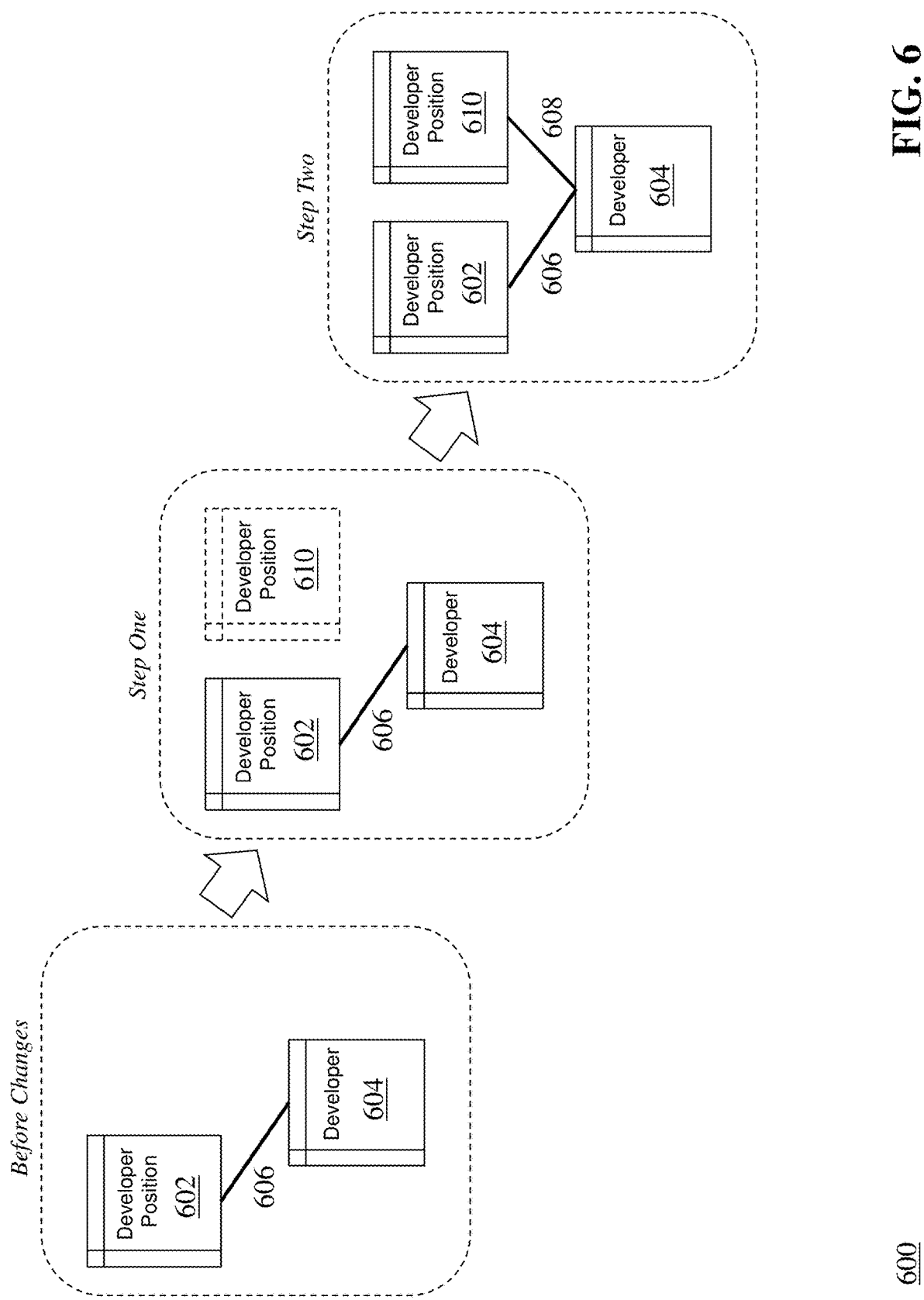
FIG. 6 is a diagram showing how the Agile organization hierarchy data structure is changed in a second use case.

FIG. 6 is a diagram showing how the Agile organization hierarchy data structure is changed in this use case. A portion of the Agile organization hierarchy data structure prior to any changes is shown on the left-hand side, with node 602 connected to node 604 via connection 606. In step one, developer position node 610 is created. In step two, connection 608 between developer node 602 and developer position node 610 is created.

It should be appreciated that in some embodiments, module 108*b* translates the received instructions into workflow commands that when executed, cause module 108*b* to update database 109 to reflect the desired changes to the data structure.

After hierarchy construction module 108*b* completes the changes to the Agile organization hierarchy data structure, module 108*b* stores the updates to the data structure in database 109. In some embodiments, module 108*b* also transmits (step 410) the updated hierarchy data structure to client computing device for display. In some embodiments, data structure visualization module 108*c* retrieves the updates to the data structure from database 109 and generates one or more UI screens based upon the updated data structure for display on client computing device 102. Upon request from client computing device 102, data structure visualization module 108*c* (via web application interface 108*d*) provides the UI screens to client computing device 102.

As mentioned above, in some embodiments one or more downstream computing systems can consume the Agile organization hierarchy data structure and perform one or more actions using the received hierarchy data structure. Agile project management system 112 can receive the Agile organization hierarchy data structure from database 109 and automatically execute one or more process flows relating to product deployment, issue tracking or other types of software development functions that relate to or otherwise utilize the Agile organization hierarchy. Using the above example of a developer being re-assigned to a different position, system 112 can traverse the hierarchy data structure and detect that the developer node previously connected to a corresponding developer position node is now connected to a different developer position node. In this example, the new developer position node may be associated with a completely different team, chapter, squad, project domain, and/or business unit.

Upon detecting this change to the hierarchy, system 112 can automatically update one or more data elements in database 114 that are associated with the developer, the old and new developer positions, and other related data elements in the Agile organization. For example, Agile project management system 112 may comprise an issue tracking system that records and manages tickets/change requests for software under development. As part of the issue tracking, system 112 may capture which developer(s) for a given Agile squad, team, etc. are assigned to specific tickets or change requests in the issue tracking system. After determining that the developer node is no longer connected to the old developer position node and is now connected to a new developer position node, system 112 can dynamically remove the developer from his or her ticket assignments for the old position and in some embodiments, automatically assign the developer to other tickets that may be associated with the new position. It should be appreciated that other types of automated workflows can be executed by system 112 in response to detecting changes to the Agile organization hierarchy data structure, such as adjustment of project timelines and deadlines, revision of project financials and budget estimates, refinement of skill sets allocated to a particular project and so forth.

Figure 7:
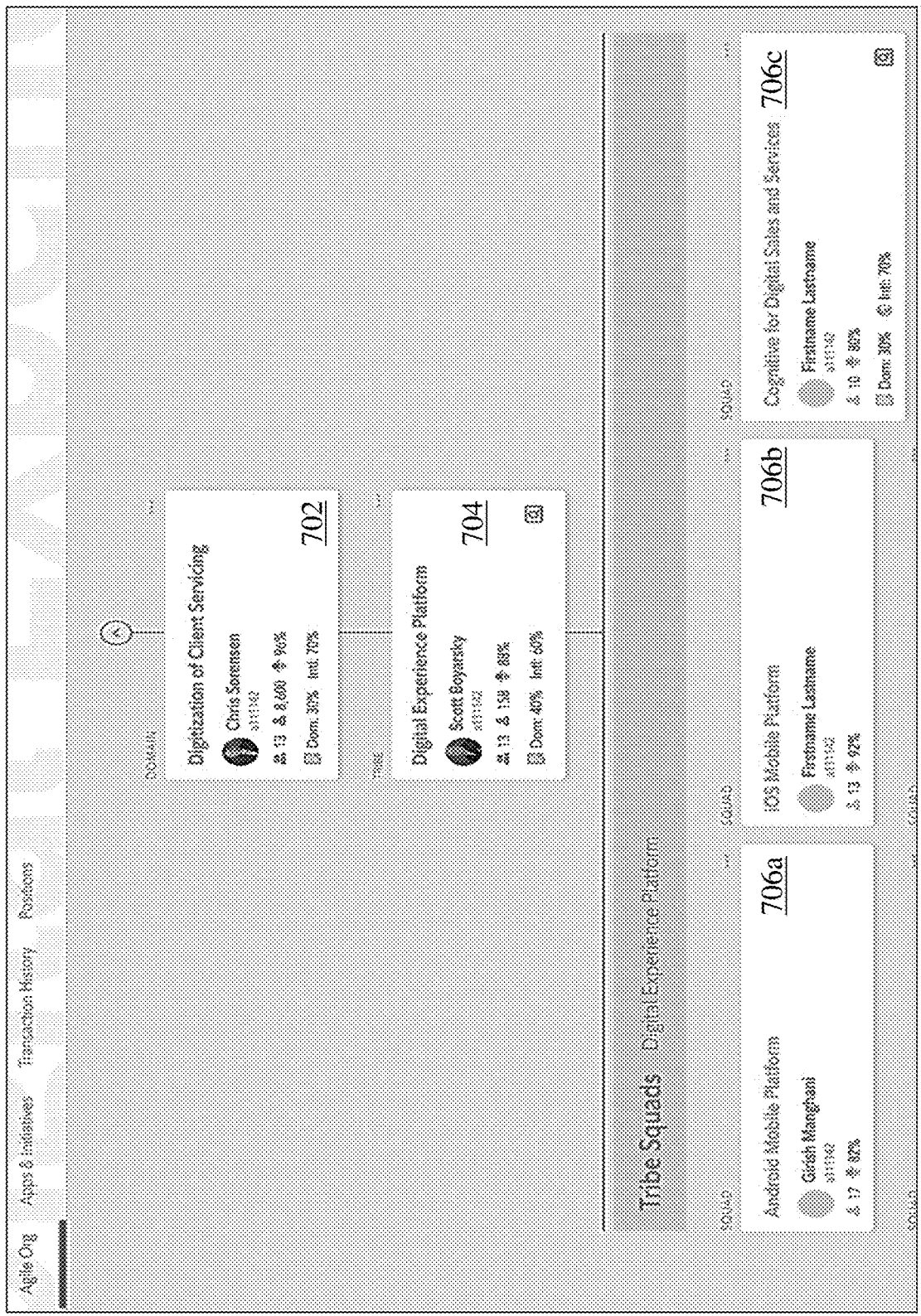
FIG. 7 is a diagram of an exemplary user interface screen for displaying an Agile organization hierarchy data structure.

FIG. 7 is a diagram of an exemplary user interface screen 700 for displaying an Agile organization hierarchy data structure, using system 100 of FIG. 1. As shown in FIG. 7, the user interface screen 700 includes a domain node 702 that identifies the domain owner for the organization hierarchy, a tribe node 702 that identifies the tribe leader for the organization hierarchy, and a plurality of squad nodes 706*a*-706*c* that identify squad leaders for each squad. Node 702 is connected to node 704 to indicate the hierarchical relationship between the nodes. Likewise, node 704 is connected to nodes 706*a*-706*c* to indicate the hierarchical relationship between the nodes. A user at client computing device 102 can view user interface screen 700 and interact with one or more nodes 702, 704, 706*a*-706*c* to, e.g., get more detailed information about a particular node.

Figure 8A:
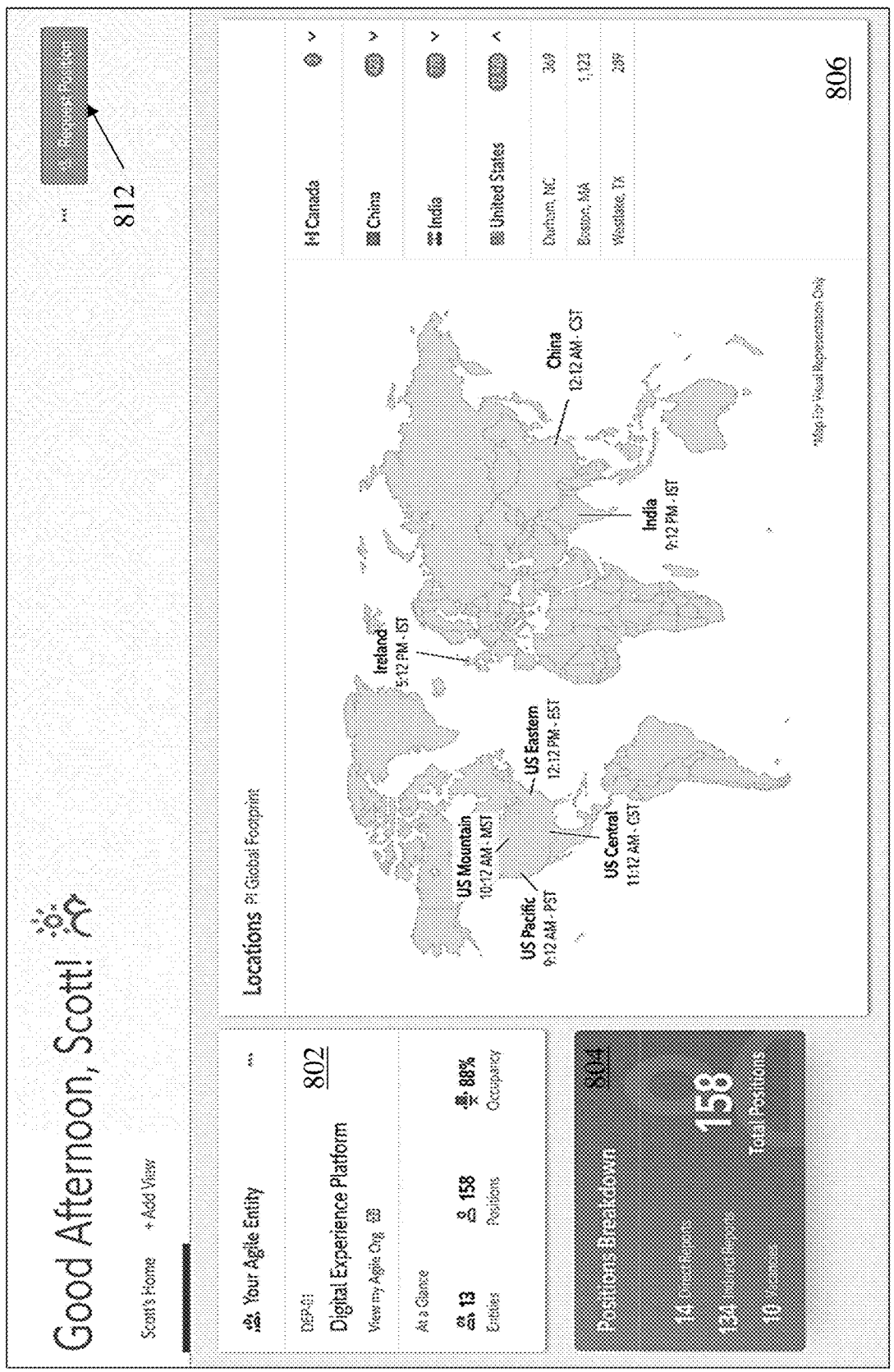
FIGS. 8A-8B comprise a diagram of an exemplary user interface screen for displaying an Agile organization hierarchy dashboard to an identified user.
Figure 8B:
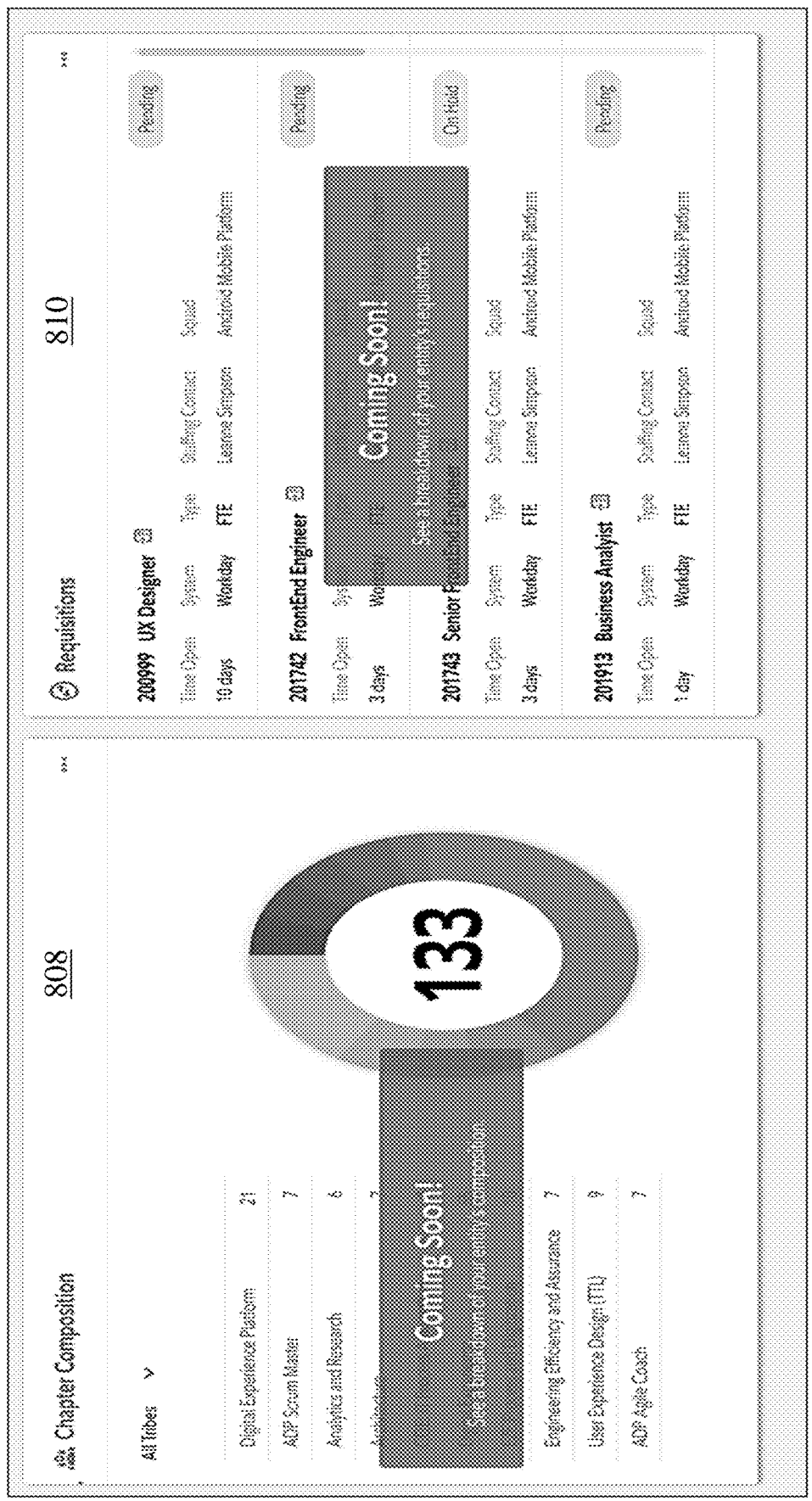

FIGS. 8A-8B collectively comprise a diagram of an exemplary user interface screen 800 for displaying an Agile organization hierarchy dashboard to an identified user, using system 100 of FIG. 1. FIG. 8A depicts an upper portion of user interface screen 800, while FIG. 8B depicts a lower portion of user interface screen 800. As shown in FIG. 8A, the dashboard user interface screen 800 includes an over-view tile 802 that displays the overall statistics for the Agile entity—such as number of positions in the entity and percentage of occupancy (i.e., the percentage of positions in the entity that are filled). The dashboard 800 also includes a positions breakdown tile 804 that displays detailed information on the positions in the Agile entity. In addition, the dashboard includes a map 806 that visually represents the geographical distribution of employees that are members of the Agile entity. Turning to FIG. 8B, the dashboard user interface also includes a chapter composition tile 808 that shows, e.g., roles and/or skill sets associated with the members of all tribes of a chapter—the user at client computing device 102 can select from different tribes to get a detailed view of roles/skill sets in a given tribe. The dashboard 800 includes a requisitions tile 810 which lists positions for which the Agile entity has requested new team members to fill the positions.

Figure 9A:
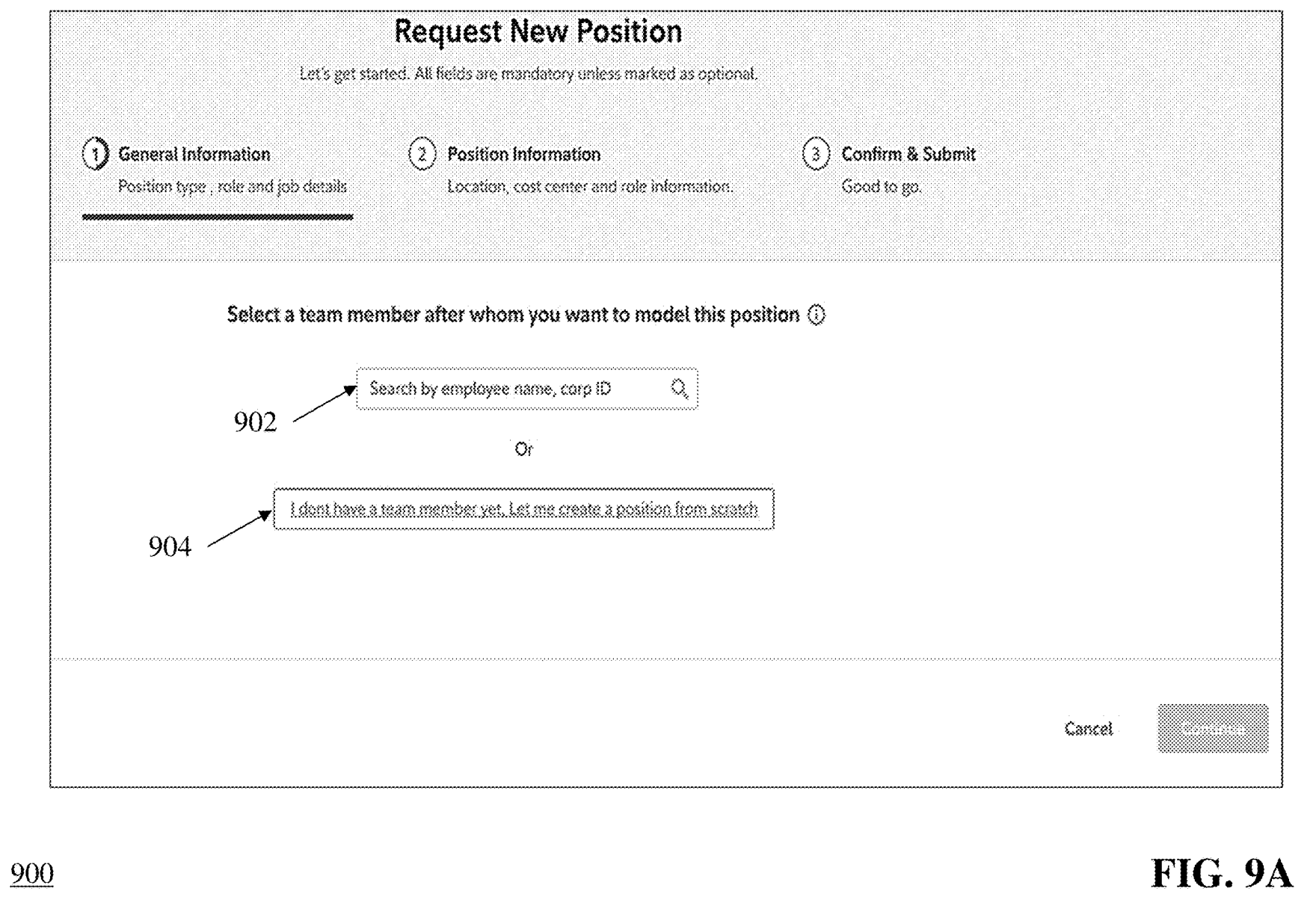

Turning back to FIG. 8A, the user interface 800 also includes a request position button 812. Clicking this button enables the user at client computing device to create a request for a new position in the Agile organization hierarchy. FIG. 9A is a diagram of an exemplary user interface screen 900 for requesting a new position, using system 100 of FIG. 1. As shown in FIG. 9, the user interface screen 900 allows a user to search (input area 902) for an existing team member to use as a model for the new position or to create a position from scratch (link 904).

Figure 9B:
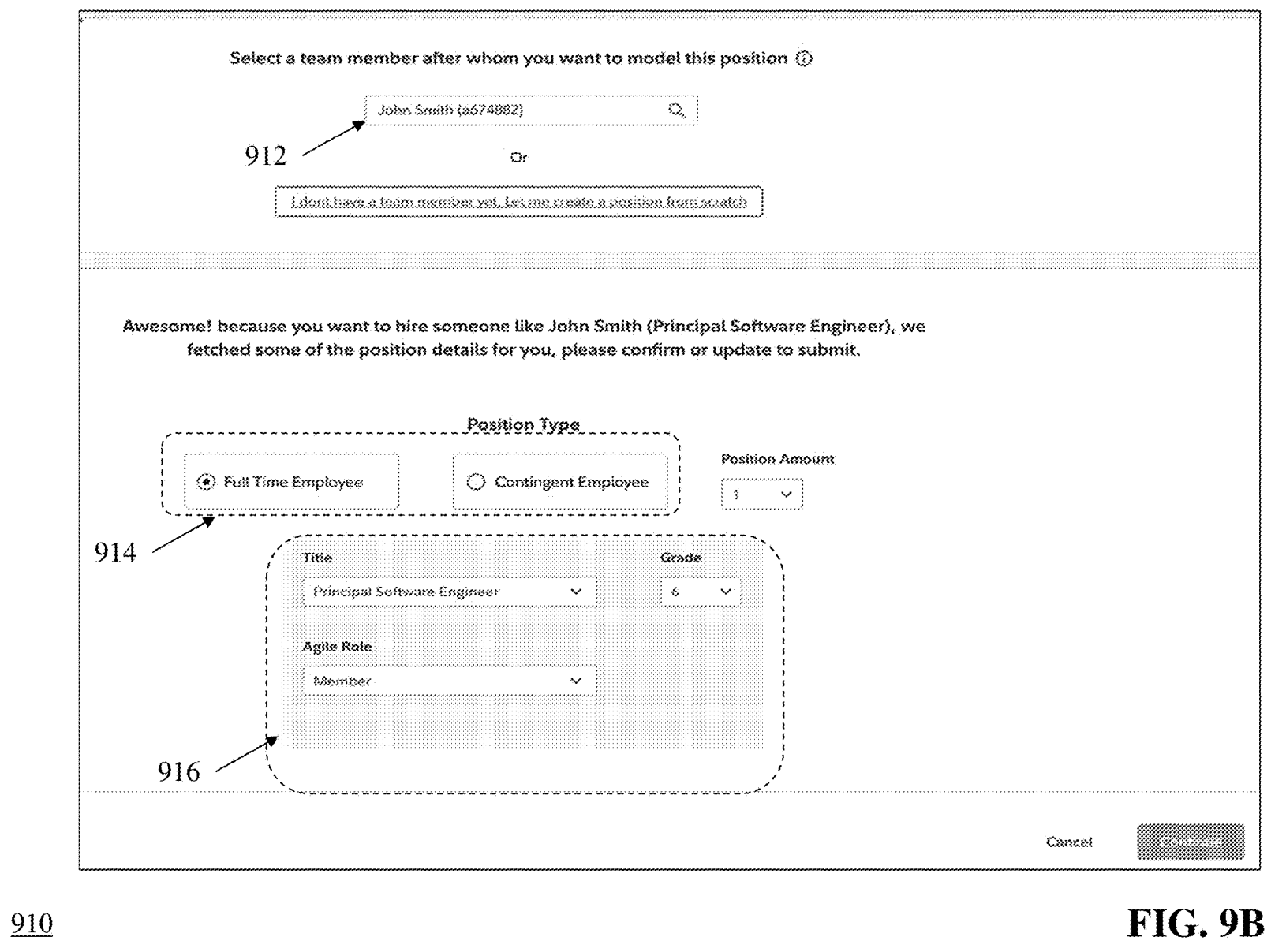

When the user searches for an existing team member, system 100 can display a template for the new position with one or more details from the existing team member pre-populated. FIG. 9B is a diagram of an exemplary user interface screen 910 that displays the pre-populated template for a new position based upon an existing team member. As shown in FIG. 9B, the user has searched for and selected "John Smith (a674882)" (input box 912) as the existing team member that will be used to create the new position. In the area below, system 100 has generated a set of input elements (e.g., radio buttons 914, drop down boxes 916) that enables the user to select specific attributes for the new position. Notably, the attributes displayed in interface 910 correspond to the attributes of "John Smith" because he was selected as the template for the new position.

Next, system 100 generates a user interface screen to allow user to specific additional attributes for the new position. FIG. 9C is a diagram of an exemplary user interface screen 920 that displays additional attributes for a new position. As shown in FIG. 9C, the interface 920 includes input elements 922 that contain other requirements and characteristics for the new position (e.g., job location, Agile entities, hiring manager, start and end dates, etc.).

After the user specifies these attributes, system 100 can generate a user interface that allows the user to review the selected attributes and confirm the request for the new position. FIG. 9D is a diagram of an exemplary user interface screen 930 that displays a review and confirmation interface for a new position. As shown in FIG. 9D, the interface 930 includes a table displaying the selected attributes for the new position 932 and buttons 934 that allow the user to edit or delete the position. Once the user is satisfied with the position attributes, the user can click on button 936 to submit the new position request.

After the new position request is submitted, the user can monitor the status of the requests. FIG. 10A is a diagram of an exemplary user interface screen 1000 that displays a list of positions for an Agile entity, including vacant positions, filled positions, pending position approvals, and requisitions. As shown in FIG. 10A, the user interface 1000 includes a grid 1002 that displays one or more positions in an Agile entity along with relevant details (e.g., ID, work assignment, home assignment, associate name, location, position manager, requisition ID (if any), start date, position status, and time on status). A user can quickly view the status of positions in the Agile entity and determine whether any further action is needed. For example, position ID POS077488 has been rejected (1004). The user can select the position in order to get more information about the rejection and to take any appropriate steps to resolve the rejection.

Figure 10B:
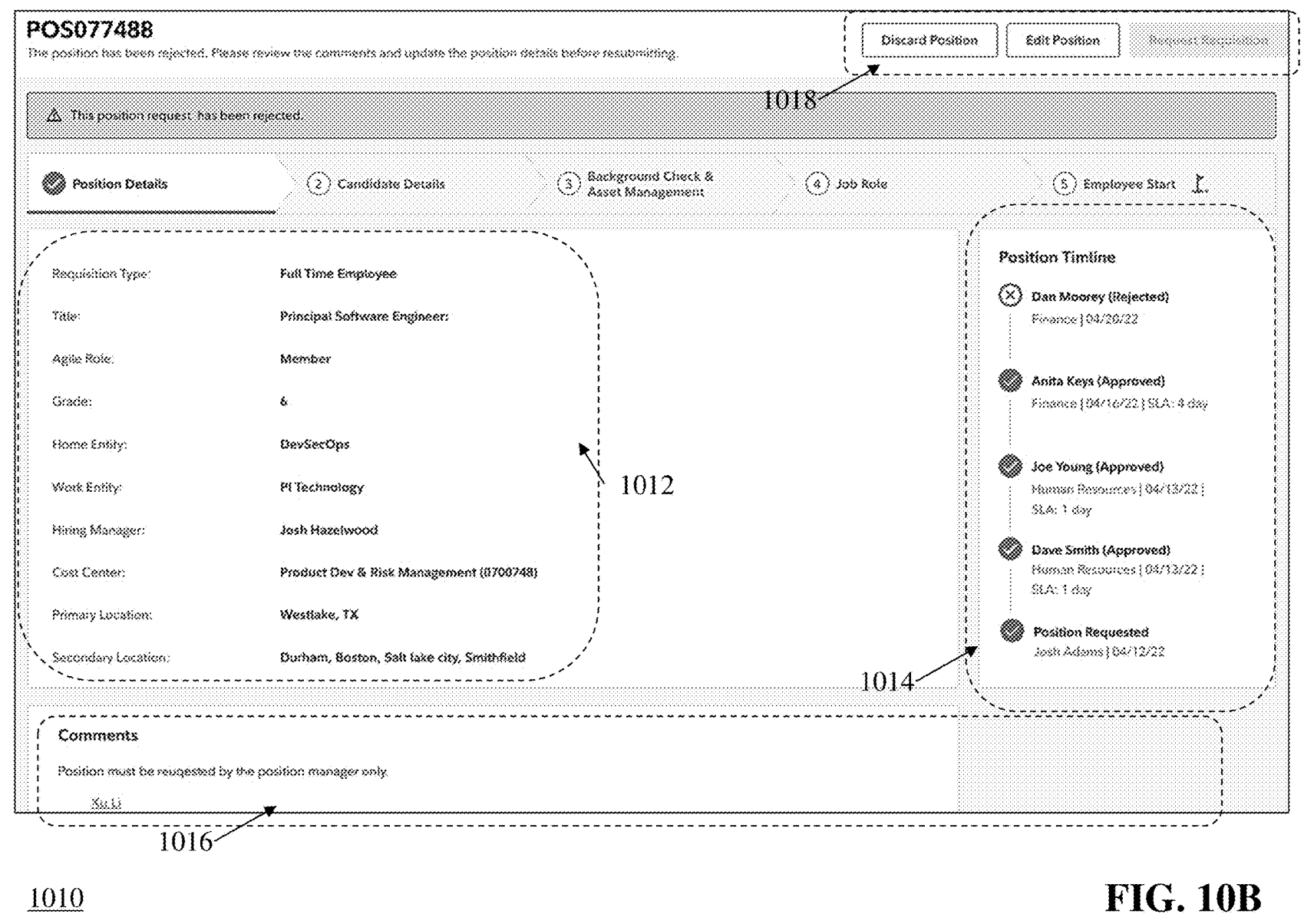

FIG. 10B is a diagram of an exemplary user interface screen 1010 that displays a position rejection detail view. As shown in FIG. 10B, the user interface 1010 includes a summary of the position details 1012 along with a timeline 1014 showing approvals and/or rejections of the new position. The user interface 1010 also includes a comments section 1016 that explains why the position was rejection and/or steps needed to remedy the rejection. Based upon this information, the user can determine whether to edit the new position and re-submit for approval, or discard the position and start over (using buttons 1018).

Figure 10C:
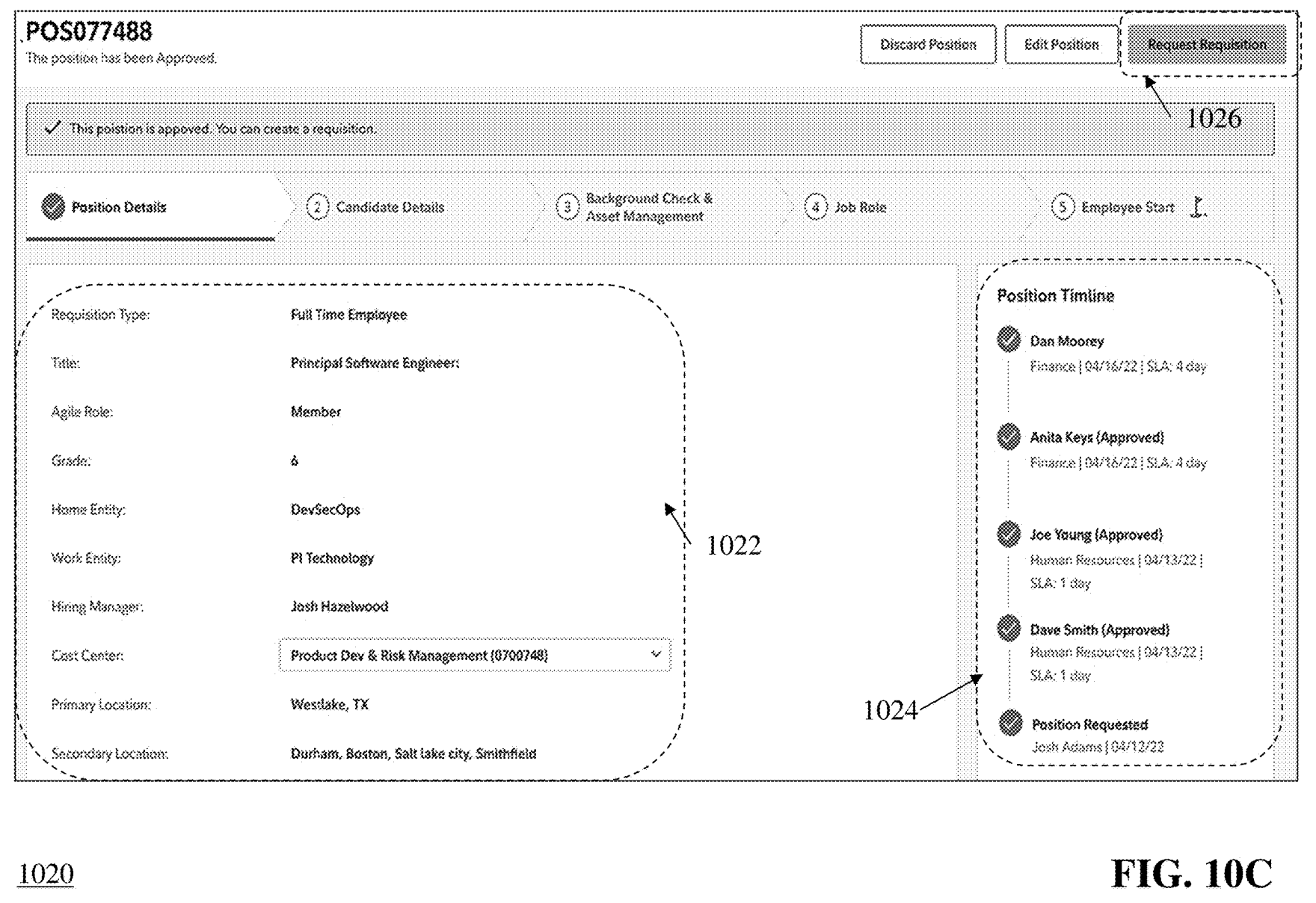

FIG. 10C is a diagram of an exemplary user interface screen 1020 that displays a position approval detail view. As shown in FIG. 10C, the user interface 1020 includes a summary of the position details 1022 along with a timeline 1024 showing approvals of the new position. The user interface 1020 also includes a button 1026 that enables the user to request a requisition (e.g., a team member to fill the new position) now that it has been approved.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for workforce management in an Agile development environment, the system comprising a server computing device having a memory that stores computer-executable instructions and a processor that executes the computer-executable instructions to:

retrieve, via a plurality of application programming interfaces, data from a plurality of siloed software development workforce applications, wherein the data includes Agile project data, Agile team structure data, developer attribute data, developer assignment data, and Agile project financial data and each siloed software development workforce application stores the corresponding data in a different format;

create a platform-agnostic, traversable Agile organization hierarchy data structure by harmonizing the retrieved data from each of the siloed software development workforce applications, the Agile organization hierarchy data structure comprising:

a plurality of developer nodes, each developer node comprising one or more attributes of a developer including a home location of the developer;

a plurality of Agile developer position nodes, each Agile developer position node comprising a position associated with one or more Agile project development teams;

a plurality of Agile team structure nodes, each Agile team structure node comprising a group of developer positions corresponding to a different facet of an Agile project development team;

a plurality of Agile project domain nodes, each Agile project domain node comprising a plurality of Agile project development team facets, and a plurality of business unit nodes, each business unit node comprising a plurality of Agile project domains, wherein each developer node is coupled to one or more Agile developer position nodes, each Agile developer position node is coupled to a plurality of Agile team structure nodes, each Agile team structure node is coupled to an Agile project domain node, and each Agile project domain node is coupled to a business unit node;

generate a first user interface comprising a graphical representation of at least a portion of the Agile organization hierarchy data structure for display on a client computing device communicatively coupled to the server computing device;

determine one or more adjustments to the Agile organization hierarchy data structure based upon input received from the client computing device;

update a connection between one or more nodes in the Agile organization hierarchy data structure based upon the determined adjustments;

generate a second user interface comprising a graphical representation of at least an adjusted portion of the Agile organization hierarchy data structure for display the client computing device, including replacing the portion of the Agile organization hierarchy data structure in the first user interface with the adjusted portion of the Agile organization hierarchy data structure; and execute an programmatic process flow in an Agile project management computing system coupled to the server computing device, wherein upon execution of the process flow, the Agile project management computing system determines a change to a developer assignment using the adjusted portion of the Agile organization hierarchy data structure and modifies one or more change request tickets in the Agile project management data system to reflect the change to the developer assignment determined from the adjusted portion of the Agile organization hierarchy data structure.

2. The system of claim 1, wherein determining one or more adjustments to the Agile organization hierarchy data structure based upon input received from the client computing device comprises:

determining one or more vacant positions in one or more Agile project domains using the Agile organization hierarchy data structure;

identifying one or more developers as candidates for each vacant position using the Agile organization hierarchy data structure; and assigning an identified developer to each vacant position and connecting the corresponding developer node to the Agile developer position node for the vacant position in the Agile organization hierarchy data structure.

3. The system of claim 2, wherein determining one or more vacant positions in one or more Agile project domains using the Agile organization hierarchy data structure comprises identifying an Agile developer position node that (i) is coupled to one or more Agile team structure nodes and (ii) is not coupled to any developer nodes.

4. The system of claim 3, wherein identifying one or more developers as candidates for each vacant position using the Agile organization hierarchy data structure comprises selecting one or more developer nodes with attributes that match the identified Agile developer position node.

5. The system of claim 4, wherein the selected one or more developer nodes are not coupled to any Agile developer position nodes.

6. The system of claim 2, wherein the server computing device updates one or more assignments in the Agile project domain to which the identified developer is assigned based upon the adjusted Agile organization hierarchy data structure.

7. The system of claim 1, wherein the different facets of the Agile project development team comprise tribes, squads, chapters, teams, and centers of excellence.

8. The system of claim 1, wherein upon displaying the second user interface, the client computing device also displays one or more aggregated developer workforce attributes associated with the adjusted portion of the Agile organization hierarchy data structure.

9. The system of claim 8, wherein the one or more aggregated developer workforce attributes comprise an active developer headcount for one or more Agile project domains, a list of open requisitions for one or more Agile project domains, and a list of vacant positions for one or more Agile project domains.

10. A computerized method of workforce management in an Agile development environment, the method comprising:

retrieving, by a server computing device via a plurality of application programming interfaces, data from a plurality of siloed software development workforce applications, wherein the data includes Agile project data, Agile team structure data, developer attribute data, developer assignment data, and Agile project financial data and each siloed software development workforce application stores the corresponding data in a different format;

creating, by the server computing device, a platform-agnostic, traversable Agile organization hierarchy data structure by harmonizing the retrieved data from each of the siloed software development workforce applications, the Agile organization hierarchy data structure comprising:

a plurality of developer nodes, each developer node comprising one or more attributes of a developer including a home location of the developer;

a plurality of Agile developer position nodes, each Agile developer position node comprising a position associated with one or more Agile project development teams;

a plurality of Agile team structure nodes, each Agile team structure node comprising a group of developer positions corresponding to a different facet of an Agile project development team;

a plurality of Agile project domain nodes, each Agile project domain node comprising a plurality of Agile project development team facets, and a plurality of business unit nodes, each business unit node comprising a plurality of Agile project domains, wherein each developer node is coupled to one or more Agile developer position nodes, each Agile developer position node is coupled to a plurality of Agile team structure nodes, each Agile team structure node is coupled to an Agile project domain node, and each Agile project domain node is coupled to a business unit node;

generating, by the server computing device, a first user interface comprising a graphical representation of at least a portion of the Agile organization hierarchy data structure for display on a client computing device communicatively coupled to the server computing device determining, by the server computing device, one or more adjustments to the Agile organization hierarchy data structure based upon input received from the client computing device;

updating, by the server computing device, a connection between one or more nodes in the Agile organization hierarchy data structure based upon the determined adjustments;

generating, by the server computing device, a second user interface comprising a graphical representation of at least an adjusted portion of the Agile organization hierarchy data structure for display the client computing device, including replacing the portion of the Agile organization hierarchy data structure in the first user interface with the adjusted portion of the Agile organization hierarchy data structure; and executing, by the server computing device, an programmatic process flow in an Agile project management computing system coupled to the server computing device, wherein upon execution of the process flow, the Agile project management computing system determines a change to a developer assignment using the adjusted portion of the Agile organization hierarchy data structure and modifies one or more change request tickets in the Agile project management data system to reflect the change to the developer assignment determined from the adjusted portion of the Agile organization hierarchy data structure.

11. The method of claim 10, wherein determining one or more adjustments to the Agile organization hierarchy data structure based upon input received from the client computing device comprises:

determining one or more vacant positions in one or more Agile project domains using the Agile organization hierarchy data structure;

identifying one or more developers as candidates for each vacant position using the Agile organization hierarchy data structure; and assigning an identified developer to each vacant position and connecting the corresponding developer node to the Agile developer position node for the vacant position in the Agile organization hierarchy data structure.

12. The method of claim 11, wherein determining one or more vacant positions in one or more Agile project domains using the Agile organization hierarchy data structure comprises identifying an Agile developer position node that (i) is coupled to one or more Agile team structure nodes and (ii) is not coupled to any developer nodes.

13. The method of claim 12, wherein identifying one or more developers as candidates for each vacant position using the Agile organization hierarchy data structure comprises selecting one or more developer nodes with attributes that match the identified Agile developer position node.

14. The method of claim 13, wherein the selected one or more developer nodes are not coupled to any Agile developer position nodes.

15. The method of claim 11, wherein the server computing device updates one or more assignments in the Agile project domain to which the identified developer is assigned based upon the adjusted Agile organization hierarchy data structure.

16. The method of claim 10, wherein the different facets of the Agile project development team comprise tribes, squads, chapters, teams, and centers of excellence.

17. The method of claim 10, wherein upon displaying the second user interface, the client computing device also displays one or more aggregated developer workforce attributes associated with the adjusted portion of the Agile organization hierarchy data structure.

18. The method of claim 17, wherein the one or more aggregated developer workforce attributes comprise an active developer headcount for one or more Agile project domains, a list of open requisitions for one or more Agile project domains, and a list of vacant positions for one or more Agile project domains.

* * * * *